US012411864B2

(12) United States Patent
Dicarlantonio et al.

(10) Patent No.: US 12,411,864 B2
(45) Date of Patent: Sep. 9, 2025

(54) SYSTEM AND METHOD FOR PROCESSING INSTRUCTIONS ASSOCIATED WITH ONE OR MORE DATA TRANSFERS

(71) Applicant: The Toronto-Dominion Bank, Toronto (CA)

(72) Inventors: Mark Anthony Dicarlantonio, Smyrna, DE (US); Peter John Sakrisson, Powhatan, VA (US)

(73) Assignee: The Toronto-Dominion Bank, Toronto (CA)

( * ) Notice: Subject to any disclaimer, the term of this patent is extended or adjusted under 35 U.S.C. 154(b) by 276 days.

(21) Appl. No.: 17/741,848

(22) Filed: May 11, 2022

(65) Prior Publication Data
US 2023/0367594 A1     Nov. 16, 2023

(51) Int. Cl.
*G06F 16/26*     (2019.01)
*G06F 9/30*     (2018.01)
(Continued)

(52) U.S. Cl.
CPC ............ *G06F 16/26* (2019.01); *G06F 16/164* (2019.01); *G06F 16/285* (2019.01); *G06F 9/3004* (2013.01); *G06F 16/954* (2019.01)

(58) Field of Classification Search
CPC ...... G06F 16/13; G06F 16/164; G06F 16/215; G06F 16/22; G06F 16/244; G06F 16/2465; G06F 16/26; G06F 16/285; G06F 16/287; G06F 16/35; G06F 16/355; G06F 16/90; G06F 16/9017; G06F 16/906; G06F 16/954; G06F 16/958; G06F 18/23; G06Q 10/0635; G06Q 40/02; G06Q 40/03; G06Q 40/08; G06Q 30/0185; G06Q 20/10; G06Q 20/12–425; G06Q 20/38; G06Q 20/382; G06Q 20/40; G06Q 20/4012; G06Q 20/4014; G06Q 20/4016; G06Q 20/403;
(Continued)

(56) References Cited

U.S. PATENT DOCUMENTS

| 7,686,214 B1 * | 3/2010 | Shao ..................... G06Q 40/03 235/382 |
| 9,648,034 B2 | 5/2017 | Bailey et al. |

(Continued)

*Primary Examiner* — Robert W Beausoliel, Jr.
*Assistant Examiner* — Cheryl M Shechtman
(74) *Attorney, Agent, or Firm* — Borden Ladner Gervais LLP; Todd Keeler

(57) ABSTRACT

Computing platforms, methods, and storage media for processing instructions associated with one or more data transfers are disclosed. Exemplary implementations may: obtain, by the apparatus, input data associated with a set of data transfer requests, the input data including a plurality of records; generate, by the apparatus and based on the input data and in the absence of a visual representation of the plurality of records, link presence indicators for the input data by automatically creating indications of presence of links between the plurality of records based on one or more of the plurality of variables; and create, by the apparatus and for storage in a memory, a set of linked data based on the input data and the generated linking relationships. Exemplary implementations focus on whether, rather than how, items are linked together, in an automated and scalable approach, and may perform analytics on the links and entities.

20 Claims, 11 Drawing Sheets

(51) Int. Cl.
*G06F 16/16* (2019.01)
*G06F 16/28* (2019.01)
*G06F 16/954* (2019.01)

(58) Field of Classification Search
CPC ........... G06Q 20/4033; G06Q 20/4037; G06Q 20/405
See application file for complete search history.

(56) References Cited

U.S. PATENT DOCUMENTS

| | | | |
|---|---|---|---|
| 10,496,992 B2 | 12/2019 | Lei et al. | |
| 10,621,492 B2 | 4/2020 | Oberhofer et al. | |
| 11,036,767 B2 | 6/2021 | Pascarella et al. | |
| 11,361,381 B1 * | 6/2022 | Lehmuth | G06F 16/212 |
| 2006/0149674 A1 * | 7/2006 | Cook | G06Q 40/02 |
| | | | 705/44 |
| 2011/0251951 A1 * | 10/2011 | Kolkowitz | G06Q 40/02 |
| | | | 705/39 |
| 2017/0017760 A1 * | 1/2017 | Freese | G16H 40/63 |
| 2020/0167787 A1 | 5/2020 | Kursun | |
| 2021/0065187 A1 * | 3/2021 | Huang | G06Q 20/4016 |
| 2021/0081963 A1 | 3/2021 | Patel | |
| 2021/0311952 A1 | 10/2021 | Jain et al. | |
| 2022/0131870 A1 * | 4/2022 | McKinnon | G06Q 20/4015 |
| 2022/0327542 A1 * | 10/2022 | Abreu | G06Q 20/4016 |

* cited by examiner

|  |
| --- |
|  |
| Email |
| akelley17rr@gmail.com |
| fayestone42@gmail.com |
| gocardinals071697@gmail.com |
| jaimess0719@yahoo.com |
| stephaniethree@aol.com |
| jessielittleblessings@gmail.com |
| jessielittleblessings@gmail.com |
| m2inktattoo@gmail.com |
| seanfitzgerald117@gmail.com |
| seanfitzgerald117@gmail.com |
| debsloan@sbcglobal.net |
| knekne49@yahoo.com |
| lisablue120830@gmail.com |
| donnellgalloway@yahoo.com |
| gregoryfrye@gmail.com |
| melisia.hobbs@gmail.com |
| barbaracoates2882@yahoo.com |
| mchba@mindspring.com |
| beauty.com19@yahoo.com |
| kalle@gmail.com |
| jcyiii3511@gmail.com |
| msv86.pp@gmail.com |

FIG.2A

| TrueIP | Initial N_0 | Email N_1 | SmartID N_2 | TrueIP N_3 |
|---|---|---|---|---|
| 172.126.250.245 | 1 | 1 | 1 | 1 |
| 172.126.250.245 | 2 | 2 | 2 | 1 |
| 172.126.250.245 | 3 | 3 | 3 | 1 |
| 172.126.250.245 | 4 | 4 | 4 | 1 |
| 172.126.250.245 | 5 | 5 | 5 | 1 |
| 172.126.250.245 | 6 | 6 | 6 | 1 |
| 67.173.38.130 | 7 | 6 | 6 | 6 |
| 69.250.238.39 | 8 | 8 | 6 | 6 |
| 71.166.53.26 | 9 | 9 | 6 | 6 |
| 100.35.225.197 | 10 | 9 | 9 | 9 |
| 174.55.18.139 | 11 | 11 | 9 | 9 |
| 107.137.249.57 | 12 | 12 | 9 | 9 |
| 144.168.239.58 | 13 | 13 | 9 | 9 |
| 131.215.220.162 | 14 | 14 | 9 | 9 |
| 131.215.220.162 | 15 | 15 | 15 | 9 |
| 131.215.220.162 | 16 | 16 | 16 | 9 |
| 67.173.38.130 | 17 | 17 | 17 | 6 |
| 67.173.38.130 | 18 | 18 | 18 | 6 |
| 157.97.132.243 | 19 | 19 | 18 | 18 |
| 107.137.249.57 | 20 | 20 | 20 | 9 |
| 34.73.37.69 | 21 | 21 | 20 | 20 |
| 144.168.239.58 | 22 | 22 | 22 | 9 |

FIG.2C

| Email | SmartID | TrueIP | Email | SmartID | TrueIP | Email | SmartID |
|---|---|---|---|---|---|---|---|
| N_4 | N_5 | N_6 | N_7 | N_8 | N_9 | N_10 | N_11 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 6 | 1 | 1 | 1 | 1 | 1 | 1 | 1 |
| 6 | 1 | 1 | 1 | 1 | 1 | 1 | 1 |
| 6 | 6 | 6 | 1 | 1 | 1 | 1 | 1 |
| 9 | 6 | 6 | 6 | 1 | 1 | 1 | 1 |
| 9 | 6 | 6 | 6 | 1 | 1 | 1 | 1 |
| 9 | 6 | 6 | 6 | 1 | 1 | 1 | 1 |
| 9 | 6 | 6 | 6 | 1 | 1 | 1 | 1 |
| 9 | 9 | 6 | 6 | 6 | 1 | 1 | 1 |
| 9 | 9 | 6 | 6 | 6 | 1 | 1 | 1 |
| 6 | 6 | 1 | 1 | 1 | 1 | 1 | 1 |
| 6 | 6 | 1 | 1 | 1 | 1 | 1 | 1 |
| 18 | 6 | 6 | 6 | 1 | 1 | 1 | 1 |
| 9 | 9 | 6 | 6 | 6 | 1 | 1 | 1 |
| 20 | 9 | 9 | 9 | 6 | 6 | 6 | 1 |
| 9 | 9 | 9 | 9 | 6 | 1 | 1 | 1 |

FIG.2D

Output data set view                                312

| Device_ID | Cluster_ID |
|---|---|
| dda2d2e6eb2846c9b62e4244c11bdfef | 998903 |
| 1a4f361c7a2d4808a55ff89f6d190174 | 998903 |
| 1a4f361c7a2d4808a55ff89f6d190174 | 998903 |
| 1d8c06c52ea948f882e5a691d1fa9048 | 998903 |
| a7405b297c414c108a1e3f8e0a1e967f | 998903 |
| b9c8034a117045dfa5b278875fe2afbd | 999044 |
| 9eab9d58ab9144cb8f752a365893bfe3 | 999044 |
| da9f8e981a0f406c97a97fcd6a8a5eeb | 999044 |
| 3889251be80d47fc9f83057a7b27a22b | 999044 |
| f7dfd14ae339450696577840c87148df | 999044 |
| 7a178d33d0e24be7a98f6ea47e063326 | 999044 |
| dc7c7b480e654970a5623220d24a61b3 | 999044 |

FIG.3D

Output data set view — 312

| number of Records in Cluster_ID | number of Email in Cluster_ID | number of Device_ID in Cluster_ID | number of IP_Address in Cluster_ID |
|---|---|---|---|
| 5 | 5 | 4 | 1 |
| 5 | 5 | 4 | 1 |
| 5 | 5 | 4 | 1 |
| 5 | 5 | 4 | 1 |
| 5 | 5 | 4 | 1 |
| 7 | 6 | 7 | 2 |
| 7 | 6 | 7 | 2 |
| 7 | 6 | 7 | 2 |
| 7 | 6 | 7 | 2 |
| 7 | 6 | 7 | 2 |
| 7 | 6 | 7 | 2 |
| 7 | 6 | 7 | 2 |

FIG.3E

SYSTEM AND METHOD FOR PROCESSING INSTRUCTIONS ASSOCIATED WITH ONE OR MORE DATA TRANSFERS

FIELD

The present disclosure relates to computing devices and data transfers, including but not limited to computing platforms, methods, and storage media for processing instructions associated with one or more data transfers.

BACKGROUND

Link analysis is a technique used to identify and evaluate relationships between connected objects or nodes. Link analysis tools typically rely on a visual or graphical representation of how items are linked.

Consider a computing process, such as an online account opening process, for example opening an account with a financial institution. Link analysis can be used as part of fraud prevention. If a number of online account opening requests are received around the same time, link analysis can be used to determine whether there is any suspicious activity based on the types of relationships identified. For example, if a number of different online account opening requests are received from the same email address or device and within a few minutes, this may be flagged as suspicious or higher risk.

Currently, despite using software to create a visual representation of connected objects, a person with the role of an investigator uses a manual process to review the data in the visual representation, and to assess and flag potential issues. Such a manual process is prone to errors and is not scalable.

Improvements in approaches for processing instructions associated with one or more data transfers are desirable.

BRIEF DESCRIPTION OF THE DRAWINGS

Embodiments of the present disclosure will now be described, by way of example only, with reference to the attached Figures.

FIGS. 2A-2D illustrate an example of a set of objects or records in relation to which a link creation and analysis method in accordance with one or more embodiments may be applied, as well as an example intermediate output of such method.

FIG. 3A-3E illustrate an example method for processing instructions associated with one or more data transfers, in accordance with one or more embodiments in a specific use case of online account-opening.

DETAILED DESCRIPTION

Figure 1:
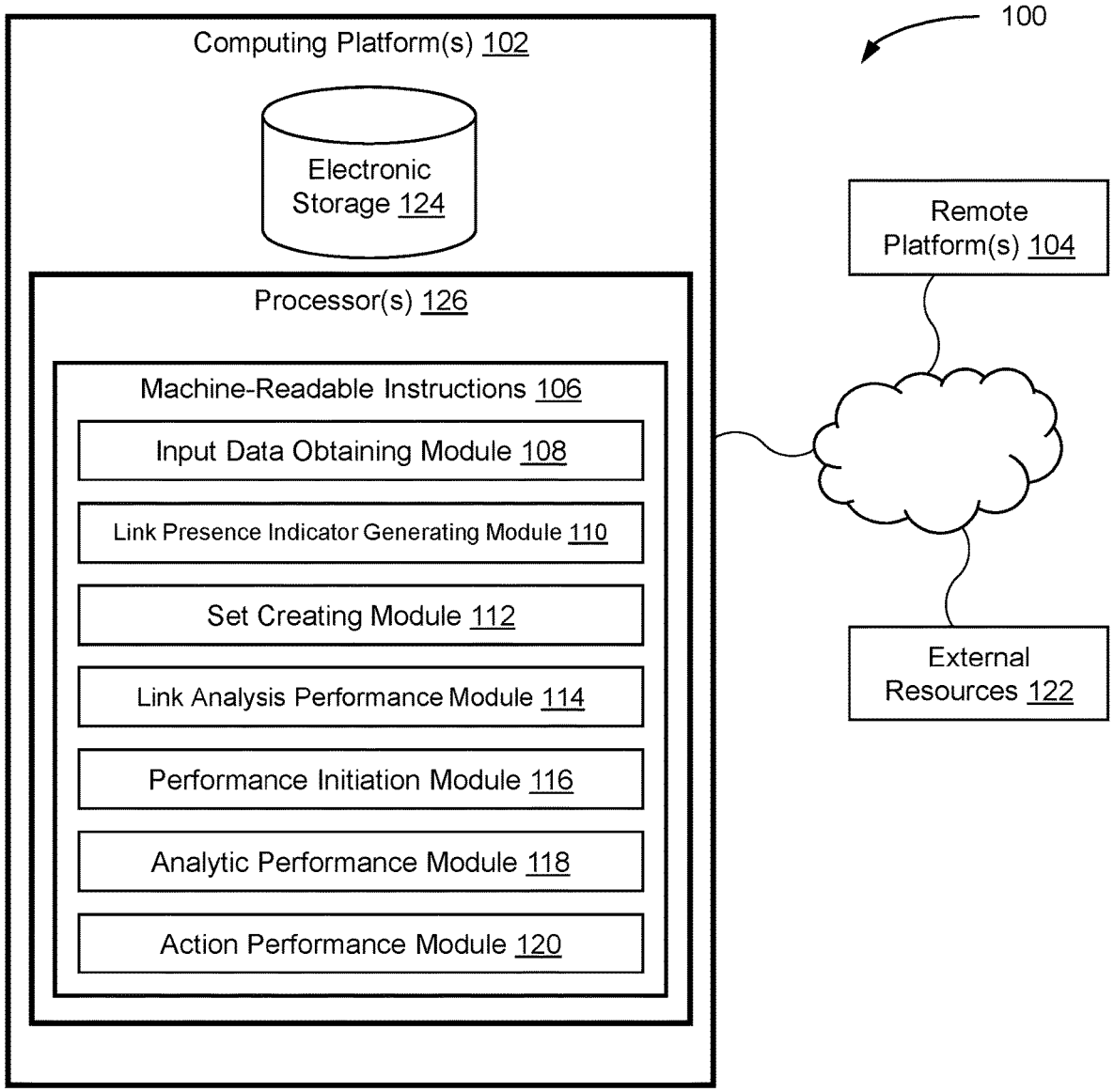
FIG. 1 illustrates a system configured for processing instructions associated with one or more data transfers, in accordance with one or more embodiments.

Computing platforms, methods, and storage media for processing instructions associated with one or more data transfers are disclosed. Exemplary implementations may: obtain, by the apparatus, input data associated with a set of data transfer requests, the input data including a plurality of records; generate, by the apparatus and based on the input data and in the absence of a visual representation of the plurality of records, link presence indicators for the input data by automatically creating indications of presence of links between the plurality of records based on one or more of the plurality of variables; and create, by the apparatus and for storage in a memory, a set of linked data based on the input data and the generated linking relationships. Exemplary implementations focus on whether, rather than how, items are linked together, in an automated and scalable approach, and may perform analytics on the links and entities.

Embodiments of the present disclosure provide an automated process of link creation and analysis, which can support fraud prevention or other processes.

In a process such as online account opening, an investigator typically uses link analysis to reduce risk by manually reviewing data based on a visual representation of connected objects. A method according to the present disclosure automatically creates links between entities, and may perform analytics on the links and entities, without having to create a visual or graphical representation. For example, analysis can be based on email address, device ID or IP address. This automated process avoids errors associated with the known manual process, omits the need to generate a visual representation, and enables scalability. Embodiments of the present disclosure are automatable, in that given a set of parameters, the system is configured to identify records or data that meet the parameters, and to action them.

One aspect of the present disclosure relates to a computing platform configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to obtain, by the apparatus, input data associated with a set of data transfer requests, the input data including a plurality of records. Each of the plurality of records may have a plurality of variables X. The processor(s) may execute the instructions to generate, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The processor(s) may execute the instructions to create, by the apparatus and for storage in a memory, a set of linked data based on the input data and the generated linking relationships.

Another aspect of the present disclosure relates to a method for processing instructions associated with one or more data transfers. The method may include obtaining, by the apparatus, input data associated with a set of data transfer requests, the input data including a plurality of records. Each of the plurality of records may have a plurality of variables X. The method may include generating, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The method may include creating, by the apparatus and for storage in a memory, a set of linked data based on the input data and the generated linking relationships.

Yet another aspect of the present disclosure relates to a non-transient computer-readable storage medium having instructions embodied thereon, the instructions being executable by one or more processors to perform a method for processing instructions associated with one or more data transfers. The method may include obtaining, by the apparatus, input data associated with a set of data transfer requests, the input data including a plurality of records. Each of the plurality of records may have a plurality of variables X. The method may include generating, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The method may include creating, by the apparatus and for storage in a memory, a set of linked data based on the input data and the generated linking relationships.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

Known approaches have to create a visual representation, and then use a method such as Dijkstra's algorithm to try to find the shortest distance between two nodes in that visual representation.

Embodiments of the present disclosure focus on whether items are linked together, and are not as concerned with how they are linked together. Using embodiments of the present disclosure, a system can automatically do in less than 30 minutes what currently takes a skilled person one full day to complete.

Consider the example use case of an online account opening process. The input data that is captured during this process, and before a client clicks Submit, can typically include: an email address; a device identifier, for example a SmartID; and an IP address, which can be a TrueIP, from which a geographic location can be determined. Using TrueIP, threat metrics can go one hop back to find the most likely true IP address, not just a spoofing. The device identifier, TrueIP and email address can all be used as threat metrics data.

Rather than trying to find the shortest distance, such as is the approach using Dijkstra's algorithm, embodiments of the present disclosure assign an arbitrary number to each item or record. The method may then cycle through each one of a plurality of variables X (e.g., email address, Smart ID, TrueIP) in relation to which linking is assessed. Data of the same value are found (e.g. the same email address), and those data are grouped together and the minimum value is selected.

Embodiments of the present disclosure are configured to perform a clustering/linking method, which can be described as follows:

1) assign an arbitrary unique number N as a label to each record in the data set
2) for each variable X used in the linking process, calculate the minimum value N, of N for each distinct value X of X
3) assign N, as the new label for all records where X=X,
4) continue this process until there exist no more changes in N for any record The linking method may then create and assign labels. Once linking is complete, the method may include creating rules against the labels, for example using an updated value of N, and performing analytics and/or creating statistics. For instance, the method may take some sort of action on all emails belonging to Ni if the total number of emails exceeds 4.

FIG. 1 illustrates a system 100 configured for processing instructions associated with one or more data transfers, in accordance with one or more embodiments. In some embodiments, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of input data obtaining module 108, link presence indicator generating module 110, set creating module 112, link analysis performance module 114, performance initiation module 116, analytic performance module 118, action performance module 120, and/or other instruction modules.

Input data obtaining module 108 may be configured to obtain, by the apparatus, input data associated with a set of data transfer requests, the input data including a plurality of records. Generating the link presence indicators may include assigning an arbitrary value N as a label to each of the plurality of records in the input data. The one or more hardware processors may be further configured to execute the instructions to generating the link presence indicators by automatically creating indications of presence of links between the plurality of records based on a data match with respect to the one or more variables of interest.

The link presence indicators indicate the presence of a link between two or more records or groups of data. The link presence indicator is not intended to indicate or represent specifics relating to how the two or more records are linked. This focus on indicating the presence of a link, rather than the specifics associated with the nature of the link and the related details, enable scalability and enable embodiments of the present disclosure to operate in the absence of a visual representation of the links.

Each of the plurality of records may have a plurality of variables X. Generating the link presence indicators may include, for each of the plurality of variables X, calculating a minimum value of $N_i$ of N for each distinct value $X_i$ of X.

The one or more hardware processors may be further configured to execute the instructions to identify, based on the obtained input data, one or more variables of interest from among the plurality of variables. The one or more variables of interest may comprise linking variables.

Link presence indicator generating module 110 may be configured to generate, by the apparatus and based on the input data and in the absence of a visual representation of the plurality of records, link presence indicators for the input data by automatically creating indications of presence of links between the plurality of records based on one or more of the plurality of variables.

Link presence indicator generating module 110 may be configured to generate the link presence indicators such that the link presence indicators indicate whether the plurality of records are linked together without indicating how the plurality of records are linked together.

Link presence indicator generating module 110 may be configured to automatically generate the link presence indicators in the absence of a graphical representation of links between the plurality of records. This is in contrast to known approaches, in which not only is a graphical representation of the links created, but such a graphical representation is integral to and necessary for performing known link analysis methods, which are performed manually by a person.

Link presence indicator generating module 110 may be configured to generate the link presence indicators based on the one or more of the plurality of variables. By way of non-limiting example, the one or more of the plurality of variables may be selected from the group consisting of email address, device identifier and IP address.

Set creating module 112 may be configured to create, by the apparatus and for storage in a memory, a set of linked data based on the input data and the generated linking relationships.

Link analysis performance module 114 may be configured to automatically perform a representationless link analysis based on the created set of linked data and in the absence of a graphical representation of links between the plurality of records.

Performance initiation module 116 may be configured to initiate performance of a fraud prevention process based on the created set of linked data.

Analytic performance module 118 may be configured to perform analytics on the linked data based on applying one or more rules to the linked data.

Action performance module 120 may be configured to perform an action relating to the set of linked data based on an output of applying one or more rules to the linked data.

In some implementations, generating the link presence indicators may include updating the label to the minimum value $N_i$ for all records where $X=X_i$. In some implementations, by way of non-limiting example, generating the link presence indicators may include continuing the assigning, the calculating, and the updating until there are no more changes in N for any record.

In an example implementation, for each LinkID, a method according to one or more embodiments determines the count of emails, SmartIDs and TrueIPs, which may be referred to as linking variables. The counts may be stored and updated in a computer-readable memory, for example as a table. The variables or fields may be used as a basis for creating or generating rules to perform analytics and/or generate statistics.

In the example use case of online account opening, the method of one or more embodiments may include the following steps:
Receive application data
Identify fields of interest (device ID, IP address, email)
Run data set through API (e.g. what table to use, what variables to link on, rule criteria)
Run clustering/linking method
Create a table that includes a cluster ID, summary statistics
Flag based on rules (e.g. number of emails in a cluster exceeds threshold)

One or more embodiments may use SQL, but other programming languages may be used to implement a clustering method or linking method as described and illustrated herein.

In addition to the example use case of online account opening, one or more embodiments of the present disclosure may be applied to fraud prevention in Peer to Peer (P2P) transactions, for example sending money through text messaging app, such as Zelle®, and identifying links through Zelle®. In a further example, one or more embodiments of the present disclosure may be applied to fraud prevention when investigating suspicious claims of fraud on a user's account, for example in a case in which the user is collaborating with others to go around in a circle paying each other. In other examples, one or more embodiments of the present disclosure may be applied to any application of existing link analytics tools, including but not limited to one or more of: forensics, terrorism investigation, or any scenario where two people or items may be connected together.

In alternative embodiments, a system may be configured to vary or manipulate what is included in clusters. For example, one or more embodiments may whitelist mobile IPs and associated hotspots, where people may have walked through a mobile hotspot, but are not actually linked together.

In some embodiments, computing platform(s) 102, remote platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 122 may be operatively linked via some other communication media.

A given remote platform 104 may include one or more processors configured to execute computer program modules. The computer program modules may be configured to enable an expert or user associated with the given remote platform 104 to interface with system 100 and/or external resources 122, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some embodiments, some or all of the functionality attributed herein to external resources 122 may be provided by resources included in system 100.

Computing platform(s) 102 may include electronic storage 124, one or more processors 126, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 124 may comprise non-transitory storage media that electronically stores information. The electronic storage media of electronic storage 124 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from computing platform(s) 102, information received from remote platform(s) 104, and/or other information that enables computing platform(s) 102 to function as described herein.

Processor(s) 126 may be configured to provide information processing capabilities in computing platform(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some embodiments, processor(s) 126 may include a plurality of processing units. These processing units may be physically located within the same device, or processor(s) 126 may represent processing functionality of a plurality of devices operating in coordination. Processor(s) 126 may be configured to execute modules 108, 110, 112, 114, 116, 118, and/or 120, and/or other modules. Processor(s) 126 may be configured to execute modules 108, 110, 112, 114, 116, 118, and/or 120, and/or other modules by software; hardware; firmware; some combination of software, hardware, and/or firmware; and/or other mechanisms for configuring processing capabilities on processor(s) 126. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, and/or 120 are illustrated in FIG. 1 as being implemented within a single processing unit, in embodiments in which processor(s) 126 includes multiple processing units, one or more of modules 108, 110, 112, 114, 116, 118, and/or 120 may be implemented remotely from the other modules. The description of the functionality provided by the different modules 108, 110, 112, 114, 116, 118, and/or 120 described below is for illustrative purposes, and is not intended to be limiting, as any of modules 108, 110, 112, 114, 116, 118, and/or 120 may provide more or less functionality than is described. For example, one or more of modules 108, 110, 112, 114, 116, 118, and/or 120 may be eliminated, and some or all of its functionality may be provided by other ones of modules 108, 110, 112, 114, 116, 118, and/or 120. As another example, processor(s) 126 may be configured to execute one or more additional modules that may perform some or all of the functionality attributed below to one of modules 108, 110, 112, 114, 116, 118, and/or 120.

Figure 2B:
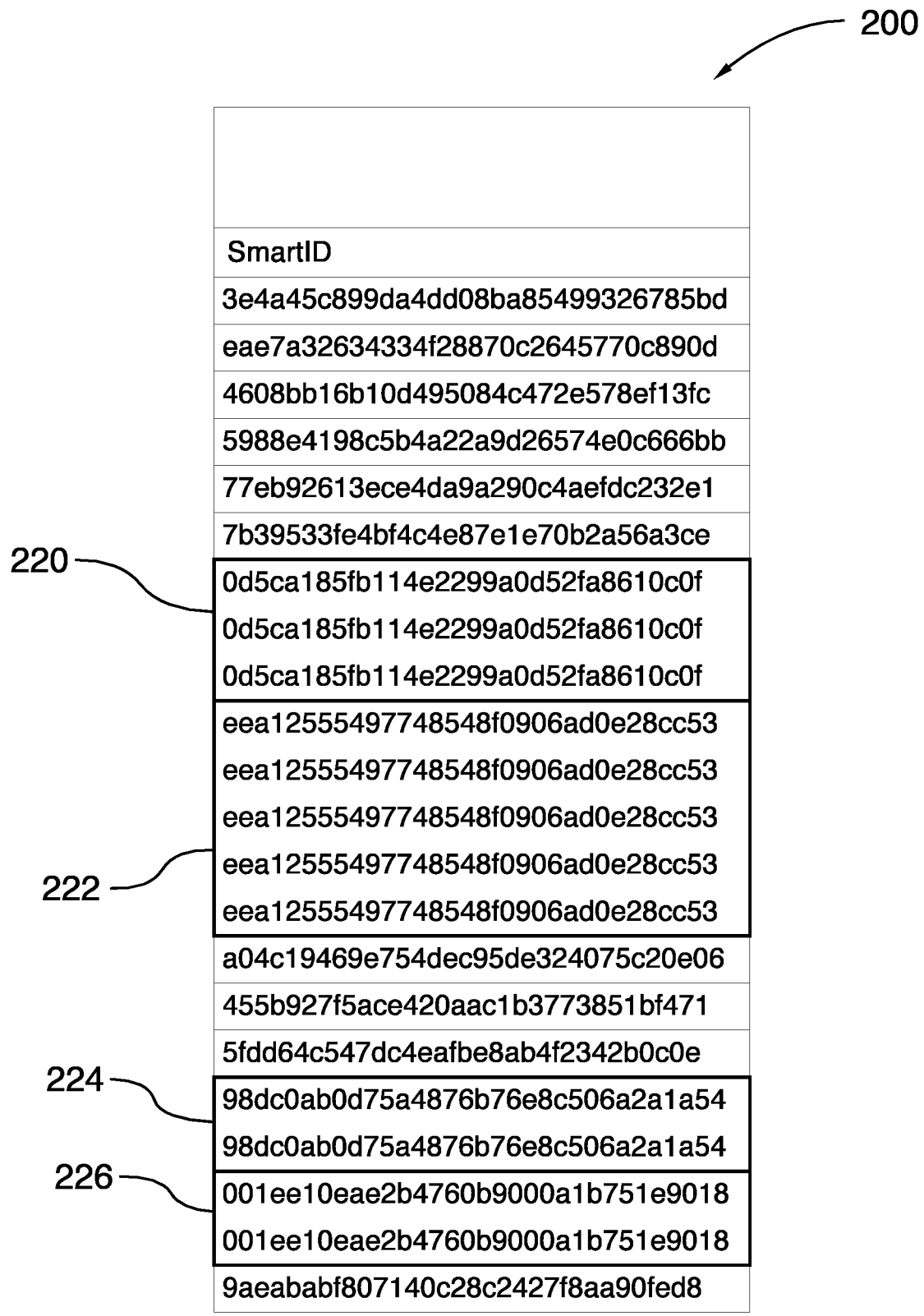

FIGS. 2A-2D illustrate an example of a set of objects or records 200 in relation to which a link creation and analysis method in accordance with one or more embodiments may be applied, as well as an example intermediate output of such method. The representations in FIGS. 2A-2D may be stitched together to form a single large table or set of records, which has been split up into separate FIGS. 2A-2D for each of illustration and representation. In this example of FIGS. 2A-2D, each object or record, represented by a row, includes an email address, a device identifier such as a SmartID, and a geographic identifier, such as an IP address or a TrueIP. A method according to one or more embodiments is applied to these records, including the clustering/linking method. In FIGS. 2C and 3D, a value that has been changed/updated in a current iteration is shown in bold.

In Step 1 of the clustering/linking method, an arbitrary unique number N is assigned as a label to each record in the data set. This is shown in FIG. 2C in a first iteration as N_0 (Initial), in which each record is assigned a unique number.

In Step 2, for each variable X used in the linking process, the method calculates the minimum value $N_i$ of N for each distinct value $X_i$ of X. In this example, the variable X may have a value of X_1=email, X_2=SmartID, X_3=TrueIP.

In the example in FIG. 2C, for the second iteration N_1, the field of Email is the variable that is examined. As indicated in FIG. 2A at 210, the sixth and seventh rows/records are found to have a matching email value "jessielittleblessings@gmail.com". Accordingly, since these two records have N values of 6 and 7, respectively, the method assigns the lowest value of 6 to both of those records, as shown under the column N_1 (Email) in FIG. 2C. Similarly, as indicated in FIG. 2A by 212, the ninth and tenth rows/records are found to have a matching email value "seanfitzgerald117@gmail.com". Accordingly, since these two records have N values of 9 and 10, respectively, the method assigns the lowest value of 9 to both of those records, as shown under the column N_1 (Email) in FIG. 2C.

In the example in FIG. 2C, for the third iteration N_2, the field of SmartID is the variable that is examined. In this iteration, as indicated in FIG. 2B by 220, the seventh through ninth rows/records are found to have a matching SmartID value. Accordingly, since these three records have N values of 6, 8 and 9, respectively, the method assigns the lowest value of 6 to all three of those records, as shown under the column N_2 (SmartID) in FIG. 2C.

Similarly, as indicated in FIG. 2B by 222, the tenth through fourteenth records/rows are found to all have the same SmartID, and the N value for all of those records is updated to 9, as shown in FIG. 2C, which was the smallest N value for that set of matching records. Also, as indicated in FIG. 2B by 224, the eighteenth and nineteenth records/rows are found to all have the same SmartID, and assigned the value 18 as shown in FIG. 2C. The twentieth and twenty-first records/rows also have the same SmartID as each other, as indicated in FIG. 2B by 226, and are assigned the value 20 as shown in FIG. 2C.

In the example in FIG. 2C, for the fourth iteration N_3, the field of TrueIP is the variable that is examined. In this iteration, as indicated in FIG. 2C by 230, the first through sixth rows/records are found to have a matching TrueIP value, and the N value for all of those records is updated to 1, which was the smallest N value for that set of matching records. As indicated by 232, the fourteenth through sixteenth rows also have a matching TrueIP value, but since they all already have the same N value, no change is needed; in an example embodiment, the method may simply rewrite the values to avoid having to add a checking step.

As indicated in FIG. 2C by 234, the seventh, seventeenth and eighteenth records/rows are found to all have the same SmartID, and the N value for all of those records is updated to 6, which was the smallest N value for that set of matching records. Similarly, as indicated by 236, the twelfth and twentieth records/rows are found to have the same SmartID, and the N value for all of those records is updated to 9, which was the smallest N value for that set of matching records. As indicated by 238, the thirteenth and twenty-second rows are found to all have the same TrueIP value, and the N value for those records is updated to 9, which was the smallest N value for that set of matching records.

According to one or more embodiments, for example as illustrated in FIG. 2D, the process continues for subsequent iterations, cycling through each of the variables again, and reassigning the N values, until there are no more changes in N for any record. In the example of FIG. 2D, this continues for iterations N_4 through N_11. At the end of this process, all objects/records with the same N value are determined to belong to the same cluster or group.

Once the linking process is complete, rules may be written against the updated value of N. For instance, a system implementing the method may be configured to take some sort of action on all emails belonging to Ni if the total number of emails exceeds 4.

FIGS. 3A-3E illustrate an example method 300 for processing instructions associated with one or more data transfers, in accordance with one or more embodiments in a specific use case of online account-opening.

Figure 3A:
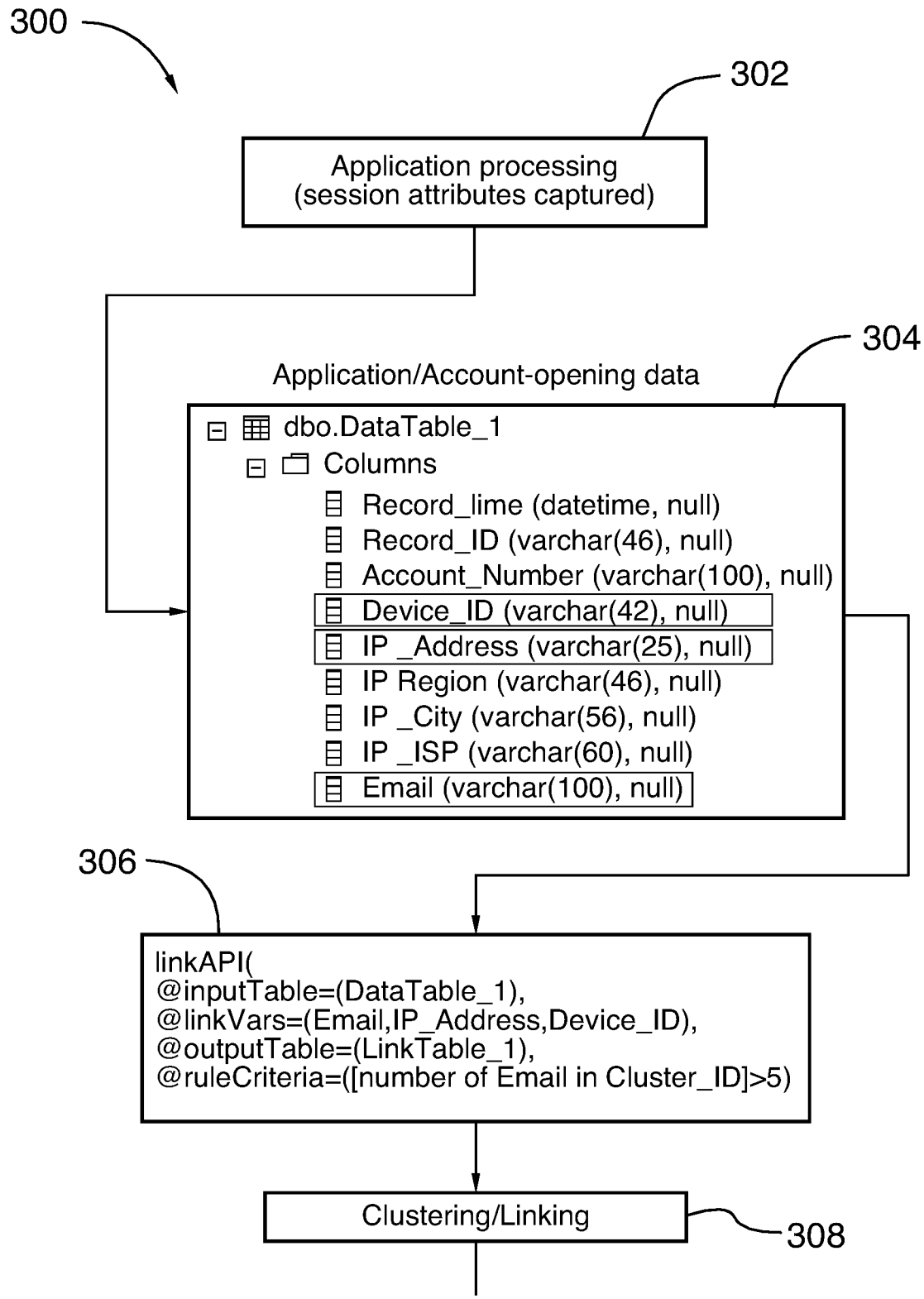
Figure 3B:
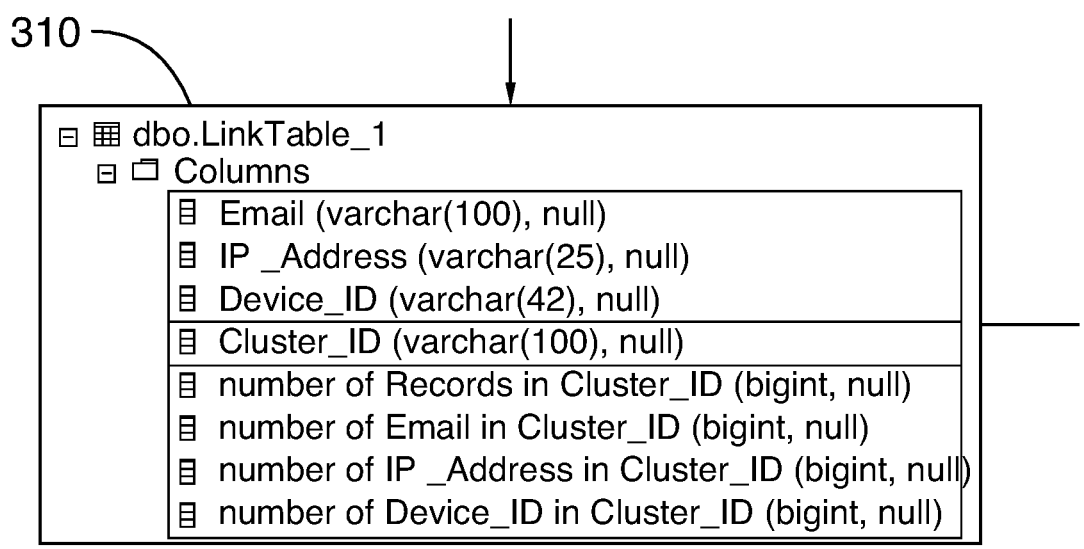

As shown in FIG. 3A, the process begins at 302 with application processing, in which session attributes are captured. The application/account-opening data is received at 304 and stored/classified into the applicable fields, in this case including Email, Device_ID and IP_Address. A call is then made to a process 306 to create an input table including the variables of interest and to output a link table using the clustering/linking method 308 outlined herein.

In the example embodiment of FIG. 3A, the sample code illustrated in association with the process 306 includes and applies a set of rules, for example the number of emails in the cluster being greater than 5, on the link table. The clustering/linking method 308 may be similar to the method and steps described in relation to FIGS. 2A-2D, and in relation to other embodiments described and illustrated herein.

Figure 3C:
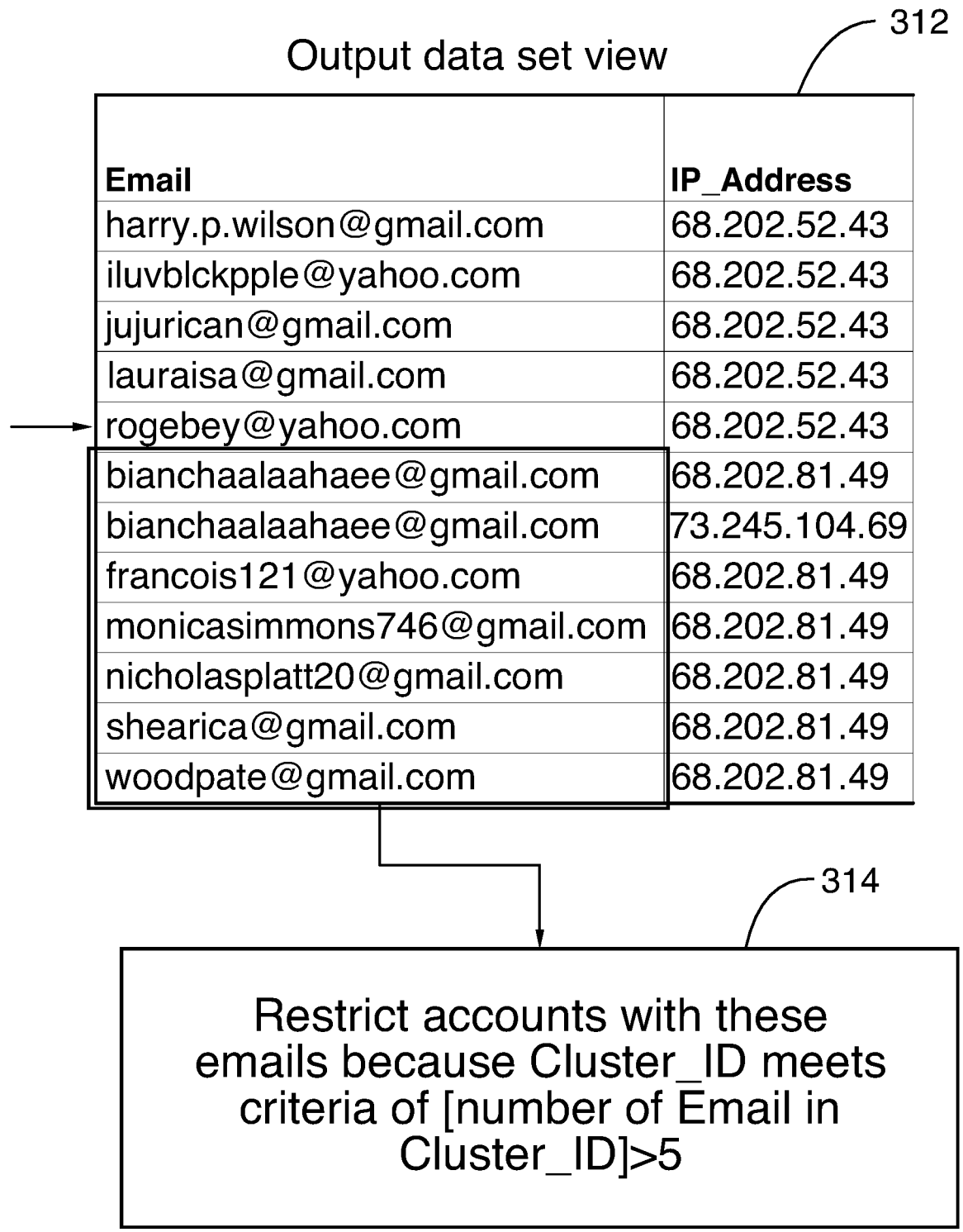

In an example implementation, a system running the method of one or more embodiments performs an operation based on the clustering/linking method 308 as shown in FIG. 3A, which may be performed in conjunction with column definitions and details shown in FIG. 3G at 310, and may also be performed in conjunction with one or more elements of the output data set view 312 in FIG. 3C, FIG. 3D and/or FIG. 3D. In an implementation, the method as shown in FIG. 3C at 314 restricts accounts with the emails that have been flagged in a cluster, in response to satisfying the rule criteria that the Cluster ID meets the criteria of the number of email in the cluster being greater than 5.

Figure 4:
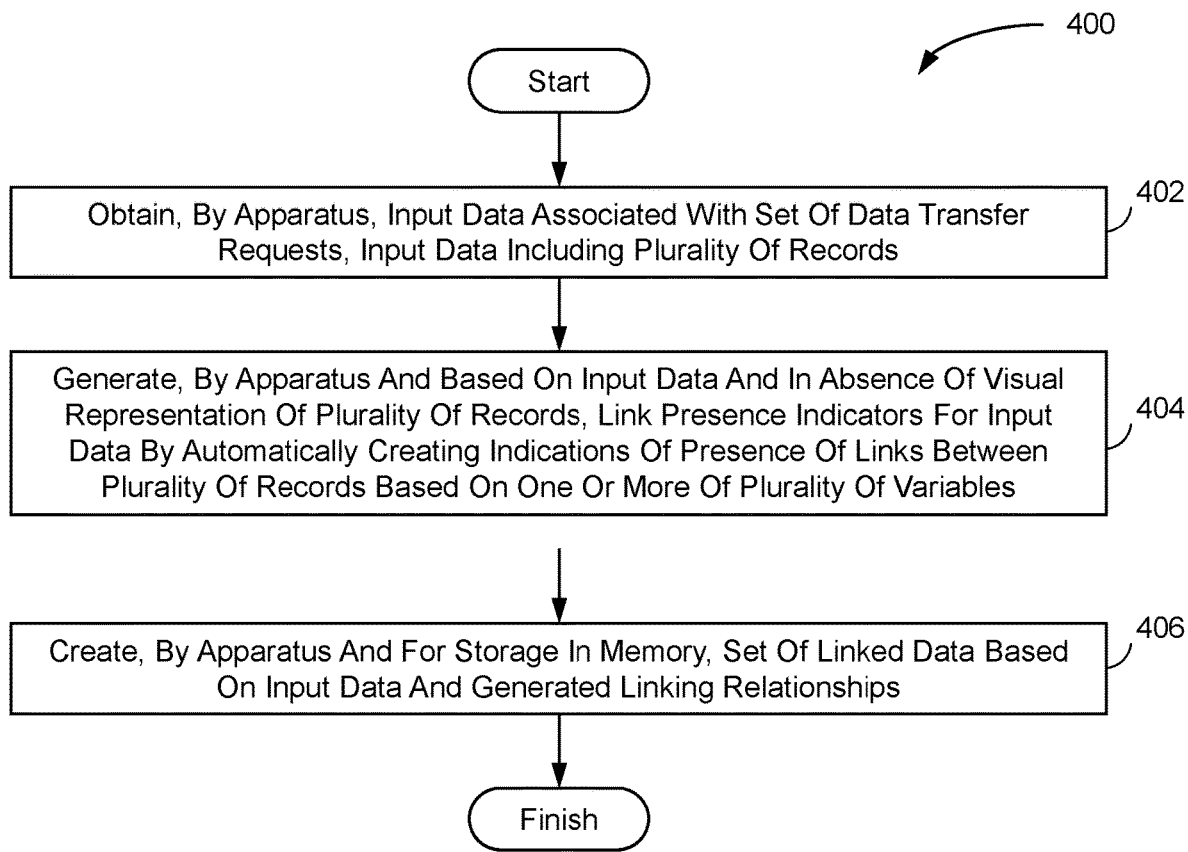
FIG. 4 illustrates a method for processing instructions associated with one or more data transfers, in accordance with one or more embodiments.

FIG. 4 illustrates a method 400 for processing instructions associated with one or more data transfers, in accordance with one or more embodiments. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining, by the apparatus, input data associated with a set of data transfer requests, the input data including a plurality of records. Each of the plurality of records may have a plurality of variables X. Operation 402 may be performed by one or more hardware processors configured by machine-readable instructions including a module that is the same as or similar to input data obtaining module 108, in accordance with one or more embodiments.

An operation 404 may include generating, by the apparatus and based on the input data and in the absence of a visual representation of the plurality of records, link presence indicators for the input data by automatically creating indications of presence of links between the plurality of records based on one or more of the plurality of variables.

Operation 404 may be performed by one or more hardware processors configured by machine-readable instructions including a module that is the same as or similar to link presence indicator generating module 110, in accordance with one or more embodiments.

An operation 406 may include creating, by the apparatus and for storage in a memory, a set of linked data based on the input data and the generated linking relationships. Operation 406 may be performed by one or more hardware processors configured by machine-readable instructions including a module that is the same as or similar to set creating module 112, in accordance with one or more embodiments.

Embodiments of the present disclosure provide an automated process of link creation and analysis, which can support fraud prevention or other processes. A method according to one or more embodiments automatically creates links between entities, and may perform analytics on the links and entities, without having to create a visual or graphical representation. Embodiments of the present disclosure are automatable, in that given a set of parameters, the system is configured to identify records or data that meet the parameters, and to action them.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out with respect to example implementations.

One aspect of the present disclosure relates to a system configured for processing instructions associated with one or more data transfers. The system may include one or more hardware processors configured by machine-readable instructions. The processor(s) may be configured to obtain, by the apparatus, input data associated with a set of data transfer requests, the input data including a plurality of records. Each of the plurality of records may have a plurality of variables X. The processor(s) may be configured to generate, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of $N_i$ of N for each distinct value $X_i$ of X. Generating the link presence indicators may include updating the label to the minimum value $N_i$ for all records where $X=X_i$. Generating the link presence indicators may include continuing the assigning, the calculating, and the updating until there are no more changes in N for any record. The processor(s) may be configured to create, by the apparatus and for storage in a memory, a set of linked data based on the input data and the generated linking relationships.

In some implementations of the system, the one or more hardware processors may be further configured to execute the instructions to identifying, based on the obtained input data, one or more variables of interest from among the plurality of variables. In some implementations of the system, the one or more hardware processors may be further configured to execute the instructions to generating the link presence indicators by automatically creating indications of presence of links between the plurality of records based on a data match with respect to the one or more variables of interest.

In some implementations of the system, the processor(s) may be configured to generate the link presence indicators such that the link presence indicators indicate whether the plurality of records are linked together without indicating how the plurality of records are linked together.

In some implementations of the system, the processor(s) may be configured to automatically generate the link presence indicators in the absence of a graphical representation of links between the plurality of records.

In some implementations of the system, the processor(s) may be configured to automatically perform a representationless link analysis based on the created set of linked data and in the absence of a graphical representation of links between the plurality of records.

In some implementations of the system, the processor(s) may be configured to generate the link presence indicators based on the one or more of the plurality of variables. In some implementations of the system, the one or more of the plurality of variables may be selected from the group consisting of email address, device identifier and IP address.

In some implementations of the system, the processor(s) may be configured to initiate performance of a fraud prevention process based on the created set of linked data.

In some implementations of the system, the processor(s) may be configured to perform analytics on the linked data based on applying one or more rules to the linked data.

In some implementations of the system, the processor(s) may be configured to perform an action relating to the set of linked data based on an output of applying one or more rules to the linked data.

Another aspect of the present disclosure relates to a method for processing instructions associated with one or more data transfers. The method may include obtaining, by the apparatus, input data associated with a set of data transfer requests, the input data including a plurality of records. Each of the plurality of records may have a plurality of variables X. The method may include generating, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The method may include creating, by the apparatus and for storage in a memory, a set of linked data based on the input data and the generated linking relationships.

In some implementations of the method, the one or more hardware processors may be further configured to execute the instructions to identifying, based on the obtained input data, one or more variables of interest from among the plurality of variables. In some implementations of the method, the one or more hardware processors may be further configured to execute the instructions to generating the link presence indicators by automatically creating indications of presence of links between the plurality of records based on a data match with respect to the one or more variables of interest.

In some implementations of the method, it may include generating the link presence indicators such that the link presence indicators indicate whether the plurality of records are linked together without indicating how the plurality of records are linked together.

In some implementations of the method, it may include automatically generating the link presence indicators in the absence of a graphical representation of links between the plurality of records.

In some implementations of the method, it may include automatically performing a representationless link analysis based on the created set of linked data and in the absence of a graphical representation of links between the plurality of records.

In some implementations of the method, it may include generating the link presence indicators based on the one or more of the plurality of variables. In some implementations of the method, the one or more of the plurality of variables may be selected from the group consisting of email address, device identifier and IP address.

In some implementations of the method, it may include initiating performance of a fraud prevention process based on the created set of linked data.

In some implementations of the method, it may include performing analytics on the linked data based on applying one or more rules to the linked data.

In some implementations of the method, it may include performing an action relating to the set of linked data based on an output of applying one or more rules to the linked data.

Yet another aspect of the present disclosure relates to a non-transient computer-readable storage medium having instructions embodied thereon, the instructions being executable by one or more processors to perform a method for processing instructions associated with one or more data transfers. The method may include obtaining, by the apparatus, input data associated with a set of data transfer requests, the input data including a plurality of records. Each of the plurality of records may have a plurality of variables X. The method may include generating, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The method may include creating, by the apparatus and for storage in a memory, a set of linked data based on the input data and the generated linking relationships.

In some implementations of the computer-readable storage medium, the one or more hardware processors may be further configured to execute the instructions to identifying, based on the obtained input data, one or more variables of interest from among the plurality of variables. In some implementations of the computer-readable storage medium, the one or more hardware processors may be further configured to execute the instructions to generating the link presence indicators by automatically creating indications of presence of links between the plurality of records based on a data match with respect to the one or more variables of interest.

In some implementations of the computer-readable storage medium, the method may include generating the link presence indicators such that the link presence indicators indicate whether the plurality of records are linked together without indicating how the plurality of records are linked together.

In some implementations of the computer-readable storage medium, the method may include automatically generating the link presence indicators in the absence of a graphical representation of links between the plurality of records.

In some implementations of the computer-readable storage medium, the method may include automatically performing a representationless link analysis based on the created set of linked data and in the absence of a graphical representation of links between the plurality of records.

In some implementations of the computer-readable storage medium, the method may include generating the link presence indicators based on the one or more of the plurality of variables. In some implementations of the computer-readable storage medium, the one or more of the plurality of variables may be selected from the group consisting of email address, device identifier and IP address.

In some implementations of the computer-readable storage medium, the method may include initiating performance of a fraud prevention process based on the created set of linked data.

In some implementations of the computer-readable storage medium, the method may include performing analytics on the linked data based on applying one or more rules to the linked data.

In some implementations of the computer-readable storage medium, the method may include performing an action relating to the set of linked data based on an output of applying one or more rules to the linked data.

Still another aspect of the present disclosure relates to a system configured for processing instructions associated with one or more data transfers. The system may include means for obtaining, by the apparatus, input data associated with a set of data transfer requests, the input data including a plurality of records. Each of the plurality of records may have a plurality of variables X. The system may include means for generating, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The system may include means for creating, by the apparatus and for storage in a memory, a set of linked data based on the input data and the generated linking relationships.

In some implementations of the system, the one or more hardware processors may be further configured to execute the instructions to identifying, based on the obtained input data, one or more variables of interest from among the plurality of variables. In some implementations of the system, the one or more hardware processors may be further configured to execute the instructions to generating the link presence indicators by automatically creating indications of presence of links between the plurality of records based on a data match with respect to the one or more variables of interest.

In some implementations of the system, the system may include means for generating the link presence indicators such that the link presence indicators indicate whether the plurality of records are linked together without indicating how the plurality of records are linked together.

In some implementations of the system, the system may include means for automatically generating the link presence indicators in the absence of a graphical representation of links between the plurality of records.

In some implementations of the system, the system may include means for automatically performing a representationless link analysis based on the created set of linked data and in the absence of a graphical representation of links between the plurality of records.

In some implementations of the system, the system may include means for generating the link presence indicators based on the one or more of the plurality of variables. In some implementations of the system, the one or more of the plurality of variables may be selected from the group consisting of email address, device identifier and IP address.

In some implementations of the system, the system may include means for initiating performance of a fraud prevention process based on the created set of linked data.

In some implementations of the system, the system may include means for performing analytics on the linked data based on applying one or more rules to the linked data.

In some implementations of the system, the system may include means for performing an action relating to the set of linked data based on an output of applying one or more rules to the linked data.

Even another aspect of the present disclosure relates to a computing platform configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to obtain, by the apparatus, input data associated with a set of data transfer requests, the input data including a plurality of records. Each of the plurality of records may have a plurality of variables X. The processor(s) may execute the instructions to generate, by the apparatus and based on the input data and in the absence of a visual representation of the plurality of records, link presence indicators for the input data by automatically creating indications of presence of links between the plurality of records based on one or more of the plurality of variables. Generating the link presence indicators may include assigning an arbitrary value N as a label to each of the plurality of records in the input data. Generating the link presence indicators may include, for each of the plurality of variables X, calculating a minimum value of Ni of N for each distinct value Xi of X. Generating the link presence indicators may include updating the label to the minimum value Ni for all records where X=Xi. Generating the link presence indicators may include continuing the assigning, the calculating, and the updating until there are no more changes in N for any record. The processor(s) may execute the instructions to create, by the apparatus and for storage in a memory, a set of linked data based on the input data and the generated linking relationships.

In some implementations of the computing platform, the one or more hardware processors may be further configured to execute the instructions to identifying, based on the obtained input data, one or more variables of interest from among the plurality of variables. In some implementations of the computing platform, the one or more hardware processors may be further configured to execute the instructions to generating the link presence indicators by automatically creating indications of presence of links between the plurality of records based on a data match with respect to the one or more variables of interest.

In some implementations of the computing platform, the processor(s) may execute the instructions to generate the link presence indicators such that the link presence indicators indicate whether the plurality of records are linked together without indicating how the plurality of records are linked together.

In some implementations of the computing platform, the processor(s) may execute the instructions to automatically generate the link presence indicators in the absence of a graphical representation of links between the plurality of records.

In some implementations of the computing platform, the processor(s) may execute the instructions to automatically perform a representationless link analysis based on the created set of linked data and in the absence of a graphical representation of links between the plurality of records.

In some implementations of the computing platform, the processor(s) may execute the instructions to generate the link presence indicators based on the one or more of the plurality of variables. In some implementations of the computing platform, the one or more of the plurality of variables may be selected from the group consisting of email address, device identifier and IP address.

In some implementations of the computing platform, the processor(s) may execute the instructions to initiate performance of a fraud prevention process based on the created set of linked data.

In some implementations of the computing platform, the processor(s) may execute the instructions to perform analytics on the linked data based on applying one or more rules to the linked data.

In some implementations of the computing platform, the processor(s) may execute the instructions to perform an action relating to the set of linked data based on an output of applying one or more rules to the linked data.

What is claimed is:

1. An apparatus configured for processing instructions associated with one or more data transfers, the apparatus comprising:
   a non-transient computer-readable storage medium having executable instructions embodied thereon; and
   one or more hardware processors configured to execute the instructions to:
      obtain, by the apparatus, input data associated with a set of data transfer requests, the input data including a plurality of records, each of the plurality of records having a plurality of variables X;
      generate, by the apparatus and based on the input data and in the absence of a visual representation of the plurality of records, link presence indicators for the input data by automatically creating indications of presence of links between the plurality of records based on one or more of the plurality of variables, wherein generating the link presence indicators includes:
         a) assign an arbitrary value N as a label to each of the plurality of variables of each of the plurality of records in the input data;
         b) determine, from the plurality of variables X, sets of variables that have the same distinct value Xi of X;
         c) for each of the determined sets of variables having the same distinct value Xi of X determine a minimum value Ni of the arbitrary values N assigned to the variables of the set of variables having the same distinct value Xi of X;
         d) update the label of the variables of the set of variables having the same distinct value Xi of X to the determined minimum value Ni;
         e) continue steps a) through d) until there are no more changes in N for any record;
      automatically create, by the apparatus and for storage in a memory, a set of linked data based on the input data and the generated link presence indicators, wherein the set of linked data includes the records associated with each of the determined set of variables having the same label $N_i$;
      automatically perform analytics on the linked data based on applying one or more rules to the linked data to determine if any of the plurality of variables meets a criteria, wherein the criteria is met when a count associated with the plurality of variables of the records of the set of linked data meets or exceeds a threshold; and
      in response to determining that any of the plurality of variables meets the criteria, restrict data transfers associated with further data transfer requests from accounts associated with the records included in the linked data.

2. The apparatus of claim 1 wherein the one or more hardware processors are further configured to execute the instructions to:
   identify, based on the obtained input data, one or more variables of interest from among the plurality of variables; and
   generate the link presence indicators by automatically creating indications of presence of links between the plurality of records based on a data match with respect to the one or more variables of interest.

3. The apparatus of claim 1 wherein the one or more hardware processors are further configured to execute the instructions to:
   generate the link presence indicators such that the link presence indicators indicate whether the plurality of records are linked together without indicating how the plurality of records are linked together.

4. The apparatus of claim 1 wherein the one or more hardware processors are further configured to execute the instructions to:
   automatically generate the link presence indicators in the absence of a graphical representation of links between the plurality of records.

5. The apparatus of claim 1 wherein the one or more hardware processors are further configured to execute the instructions to:
   automatically perform a representationless link analysis based on the created set of linked data and in the absence of a graphical representation of links between the plurality of records.

6. The apparatus of claim 1 wherein the one or more hardware processors are further configured to execute the instructions to:
   generate the link presence indicators based on the one or more of the plurality of variables, wherein the one or more of the plurality of variables are selected from the group consisting of email address, device identifier and IP address.

7. The apparatus of claim 1 wherein the one or more hardware processors are further configured to execute the instructions to:
   initiate performance of a fraud prevention process based on the created set of linked data.

8. The apparatus of claim 1 wherein the count is a count associated with any of the sets of variables having the same distinct value Xi of X.

9. The apparatus of claim 1 wherein the one or more hardware processors configured to execute the instructions to restrict data transfers associated with further data transfer requests from accounts associated with the records included in the linked data comprise the one or more processors configured to execute the instructions to:
   prevent transactions that are associated with accounts associated with the records included in the linked data.

10. A computer-implemented method for processing by an apparatus instructions associated with one or more data transfers, the method comprising:
   obtaining, by the apparatus, input data associated with a set of data transfer requests, the input data including a plurality of records, each of the plurality of records having a plurality of variables X;

generating, by the apparatus and based on the input data and in the absence of a visual representation of the plurality of records, link presence indicators for the input data by automatically creating indications of presence of links between the plurality of records based on one or more of the plurality of variables, wherein generating the link presence indicators includes:
a) assigning an arbitrary value N as a label to each of the plurality of variables of each of the plurality of records in the input data;
b) determining, from the plurality of variables X, sets of variables that have the same distinct value Xi of X;
c) each of the determined sets of variables having the same distinct value Xi of X determining a minimum value Ni of the arbitrary values N assigned to the variables of the set of variables having the same-distinct value Xi of X;
d) updating the label of the variables of the set of variables having the same distinct value Xi of X to the determined minimum value Ni;
e) continuing steps a) through d) until there are no more changes in N for any record;

automatically creating, by the apparatus and for storage in a memory, a set of linked data based on the input data and the generated link presence, wherein the set of linked data includes the records associated with each of the determined set of variables having the same label $N_i$;

automatically performing analytics on the linked data based on applying one or more rules to the linked data to determine if any of the plurality of variables meets a criteria, wherein the criteria is met when a count associated with the plurality of variables of the records of the set of linked data meets or exceeds a threshold; and in response to determining that any of the plurality of variables meets the criteria, restricting data transfers associated with further data transfer requests from accounts associated with the records included in the linked data.

11. The method of claim 10 wherein the one or more hardware processors are further configured to execute the instructions to:
identifying, based on the obtained input data, one or more variables of interest from among the plurality of variables; and
generating the link presence indicators by automatically creating indications of presence of links between the plurality of records based on a data match with respect to the one or more variables of interest.

12. The method of claim 10 further comprising:
generating the link presence indicators such that the link presence indicators indicate whether the plurality of records are linked together without indicating how the plurality of records are linked together.

13. The method of claim 10 further comprising:
automatically generating the link presence indicators in the absence of a graphical representation of links between the plurality of records.

14. The method of claim 10 further comprising:
automatically performing a representationless link analysis based on the created set of linked data and in the absence of a graphical representation of links between the plurality of records.

15. The method of claim 10 further comprising:
generating the link presence indicators based on the one or more of the plurality of variables, wherein the one or more of the plurality of variables are selected from the group consisting of email address, device identifier and IP address.

16. The method of claim 10 further comprising:
initiating performance of a fraud prevention process based on the created set of linked data.

17. The method of claim 10, wherein the count is associated with any of the sets of variables having the same distinct value Xi of X.

18. The method of claim 10, wherein restricting data transfers associated with further data transfer requests from accounts associated with the records included in the linked data comprises:
preventing transactions that are associated with accounts associated with the records included in the linked data.

19. A non-transient computer-readable storage medium having instructions embodied thereon, the instructions being executable by one or more processors of an apparatus to perform a method for providing data access, the method comprising:
obtaining, by the apparatus, input data associated with a set of data transfer requests, the input data including a plurality of records, each of the plurality of records having a plurality of variables X;
generating, by the apparatus and based on the input data and in the absence of a visual representation of the plurality of records, link presence indicators for the input data by automatically creating indications of presence of links between the plurality of records based on one or more of the plurality of variables, wherein generating the link presence indicators includes:
a) assigning an arbitrary value N as a label to each of the plurality of variables of each of the plurality of records in the input data;
b) determining, from the plurality of variables X, sets of variables that have the same distinct value Xi of X;
c) each of the determined sets of variables having the same distinct value Xi of X determining a minimum value Ni of the arbitrary values N assigned to the variables of the set of variables having the same distinct value Xi of X;
d) updating the label of the variables of the set of variables having the same distinct value Xi of X to the determined minimum value Ni;
e) continuing steps a) through d) until there are no more changes in N for any record;
automatically creating, by the apparatus and for storage in a memory, a set of linked data based on the input data and the generated link presence indicators, wherein the set of linked data includes the records associated with each of the determined set of variables having the same label $N_i$;
automatically performing analytics on the linked data based on applying one or more rules to the linked data to determine if any of the plurality of variables meets a criteria, wherein the criteria is met when a count associated with the plurality of variables of the records of the set of linked data meets or exceeds a threshold; and
in response to determining that any of the plurality of variables meets the criteria, restricting data transfers associated with further data transfer requests from accounts associated with the records included in the linked data.

20. The non-transient computer-readable storage medium of claim 19 wherein the method further comprises:
identifying, based on the obtained input data, one or more variables of interest from among the plurality of variables; and
generating the link presence indicators by automatically creating indications of presence of links between the plurality of records based on a data match with respect to the one or more variables of interest.

* * * * *